(12) United States Patent
Won

(10) Patent No.: US 8,510,035 B2
(45) Date of Patent: Aug. 13, 2013

(54) TRAVEL INFORMATION SERVICE SYSTEM AND METHOD FOR PROVIDING TRAVEL INFORMATION OF THE SAME SYSTEM

(75) Inventor: Joonghie Won, Gyeonggi-do (KR)

(73) Assignee: Thinkware Systems Corporation, Seoul (KR)

( * ) Notice: Subject to any disclaimer, the term of this patent is extended or adjusted under 35 U.S.C. 154(b) by 1046 days.

(21) Appl. No.: 12/525,505

(22) PCT Filed: Dec. 27, 2007

(86) PCT No.: PCT/KR2007/006857
§ 371 (c)(1),
(2), (4) Date: Jul. 31, 2009

(87) PCT Pub. No.: WO2008/093935
PCT Pub. Date: Aug. 7, 2008

(65) Prior Publication Data
US 2010/0063721 A1    Mar. 11, 2010

(30) Foreign Application Priority Data

Feb. 2, 2007  (KR) .................. 10-2007-0010972

(51) Int. Cl.
*G01C 21/36* (2006.01)
(52) U.S. Cl.
CPC ........ *G01C 21/3679* (2013.01); *G01C 21/3611* (2013.01)
USPC ...... 701/418; 701/438; 701/454; 340/995.27; 340/995.24
(58) Field of Classification Search
CPC ................ G01C 21/3611; G01C 21/3679
USPC ................ 701/418, 438, 454; 340/995.24, 340/995.27
See application file for complete search history.

(56) References Cited

U.S. PATENT DOCUMENTS

| 5,559,707 | A | * | 9/1996 | DeLorme et al. | 701/467 |
| 5,635,953 | A | * | 6/1997 | Hayami et al. | 715/855 |
| 5,819,201 | A | * | 10/1998 | DeGraaf | 701/29.4 |
| 5,948,040 | A | * | 9/1999 | DeLorme et al. | 701/426 |
| 6,009,403 | A | * | 12/1999 | Sato | 705/6 |

(Continued)

FOREIGN PATENT DOCUMENTS

| JP | 16-144506 A | 5/2004 |
| KR | 10-2006-0095601 A | 9/2006 |
| KR | 10-2006-0114943 A | 11/2006 |

OTHER PUBLICATIONS

Australian Government IP Australia, "Examiner's First Report", by Officer Steve Lee in Australian Application No. 2007346028; Document of 2 pages dated May 24, 2010.

*Primary Examiner* — Mark Hellner
*Assistant Examiner* — Ari M Diacou
(74) *Attorney, Agent, or Firm* — Duane Morris LLP; Pablo Meles

(57) ABSTRACT

A travel information service system and a method of providing a travel information service which can perform guidance of travel information appropriate for a travel purpose and a travel type are provided. The method of providing the travel information service includes: a first operation of providing a travel course for each area and point of interest (POI) information for each course using a user interface; a second operation of creating a travel route based on user selection of the travel course for each area and the POI information for each course; and a third operation of performing map guidance based on the created travel route.

19 Claims, 23 Drawing Sheets

(56) References Cited

U.S. PATENT DOCUMENTS

| | | |
|---|---|---|
| 6,249,740 B1 * | 6/2001 | Ito et al. .................. 701/420 |
| 6,356,837 B1 * | 3/2002 | Yokota et al. .................. 701/411 |
| 2001/0020211 A1 * | 9/2001 | Takayama et al. ............ 701/200 |
| 2010/0063721 A1 * | 3/2010 | Won .............................. 701/201 |

* cited by examiner

FIG. 4
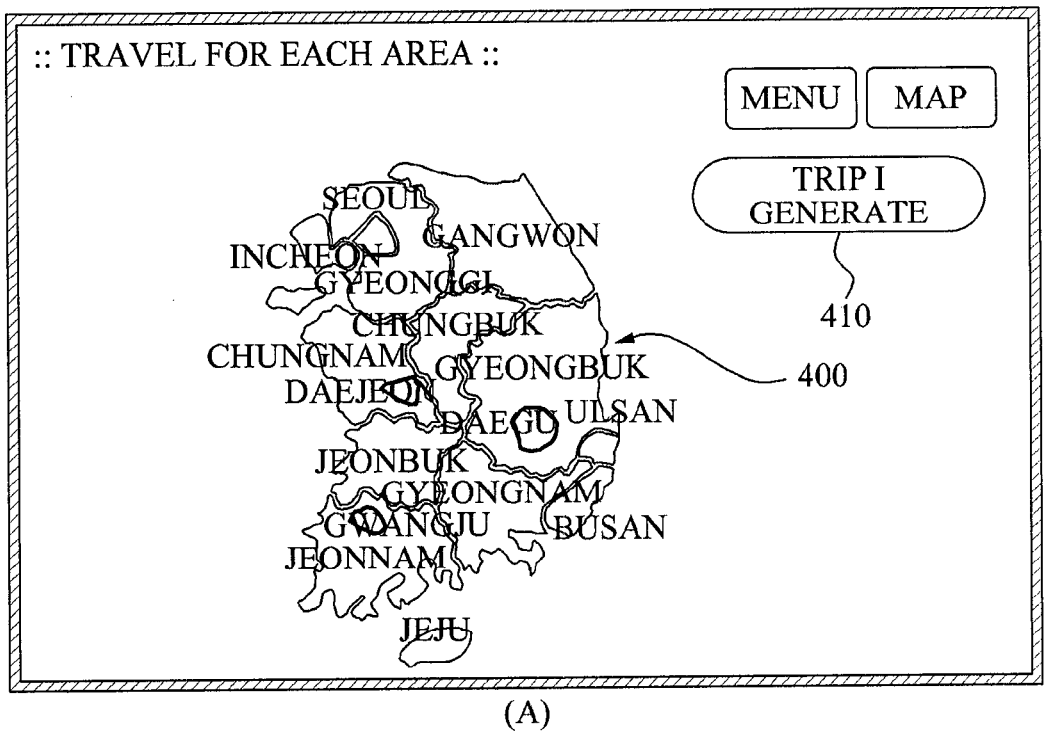
(A)
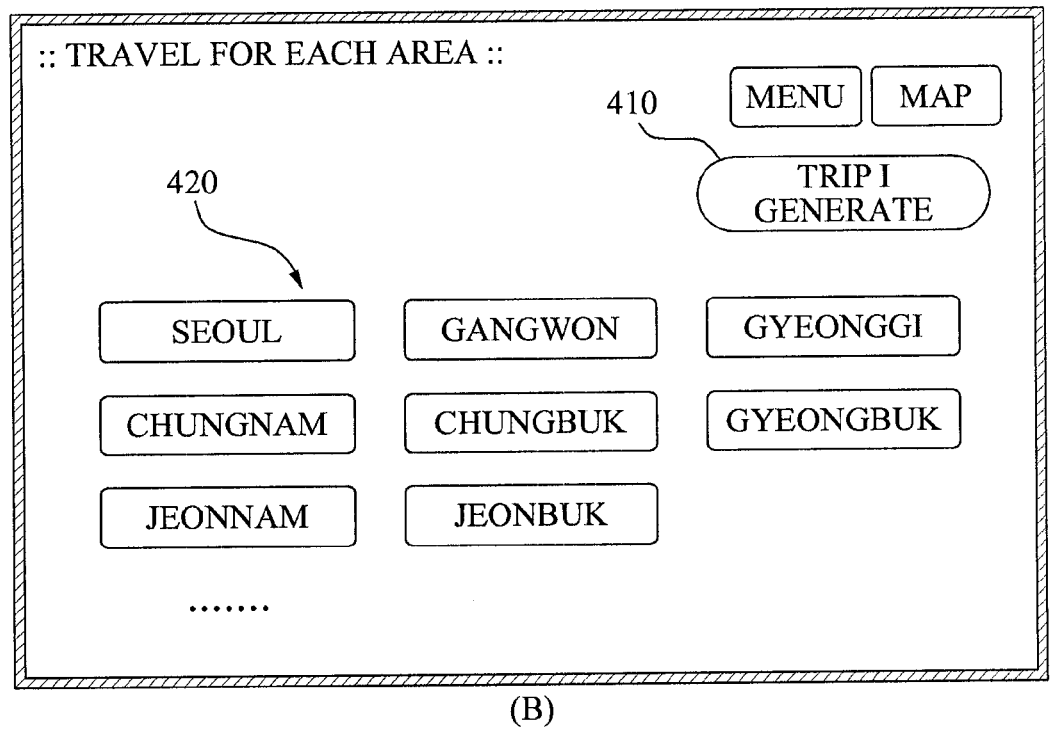
(B)

FIG. 9

:: TRAVEL FOR EACH AREA ::

CURRENT LOCATION : TOURISM COMPLEX INFORMATION
→ RECOMMENDED ATTRACTION

[MENU] [MAP]

910 — INAVI) 920 — RECOMMENDATION COURSE  930 — [COUPLE] DATE COURSE →

940

| SELECTION | INDIVIDUAL TRIP NAME | DISTANCE | ESTIMATED REQUIRED TIME |
|---|---|---|---|
| ☑ | 1. CHARBROILED RIBS OF BOMUN | 25.6KM | ABOUT 3 HOUR 30 MINUTES |
| ☐ | 2. BOMUN THEME WORLD | 25.6KM | ABOUT 3 HOUR 30 MINUTES |
| ☐ | 3. MT. BOMUN NATIONAL PARK | 25.6KM | ABOUT 3 HOUR 30 MINUTES |
| ☐ | 4. STEAMED ANGLER OF MASAN | 25.6KM | ABOUT 3 HOUR 30 MINUTES |
| ☐ | 5. MT. BOMUN NATIONAL PARK | 25.6KM | ABOUT 3 HOUR 30 MINUTES |

*COURSE SEQUENCE MAY BE CHANGED UPWARDS AND DOWNWARDS AFTER CORRESPONDING POI IS SELECTED.

[DETAILED VIEW] [LOCATION VIEW] [PREVIOUS] [TRIP GENERATION]

:: TRAVEL FOR EACH AREA ::

CURRENT LOCATION : TOURISM COMPLEX INFORMATION
→DETAILED INFORMATION OF INDIVIDUAL POI  151

DETAILED INFORMATION ABOUT STEAMED ANGLER OF JINDO

HOT TASTE OF JINDO! INTRODUCTION OF STEAMED ANGLER OF JINDO

THANK YOU FOR VISITING HOMEPAGE OF ORIGINAL JINDO SPECIALTY STORE OF ANGLER AND SWELLFISH. ORIGINAL JINDO SPECIALTY STORE OF ANGLER AND SWELLFISH STARTED IN 1973 AND HAS BEEN DEVELOPED FOR 30 YEARS. SINCE MASAN ANGLER FOOD WAS FIRST INTRODUCED IN SINSA-DONG, SEOUL, THIS RESTAURANT HAS SPECIALIZED IN ONLY ANGLER FOOD FOR 30 YEARS, AND EVERY EFFORT HAS BEEN MADE FOR PROVIDING YOU WITH GREATEST TASTE, THIS RESTAURANT IS POPULAR AMONG CUSTOMERS AND IS RECOGNIZED AS GREATEST RESTAURANT. WE WILL DO OUR BEST TO PROVIDE CUSTOMERS WITH SPECIALIZED FOOD OF ORIGINAL JINDO SPECIALTY STORE OF ANGLER AND SWELLFISH NATIONWIDE.

MENU  MAP

TRIP 1 GENERATE

PHOTOGRAPH INFORMATION  152
OUTLINE MAP VIEW  153
PREVIOUS

CLICK

FIG. 13
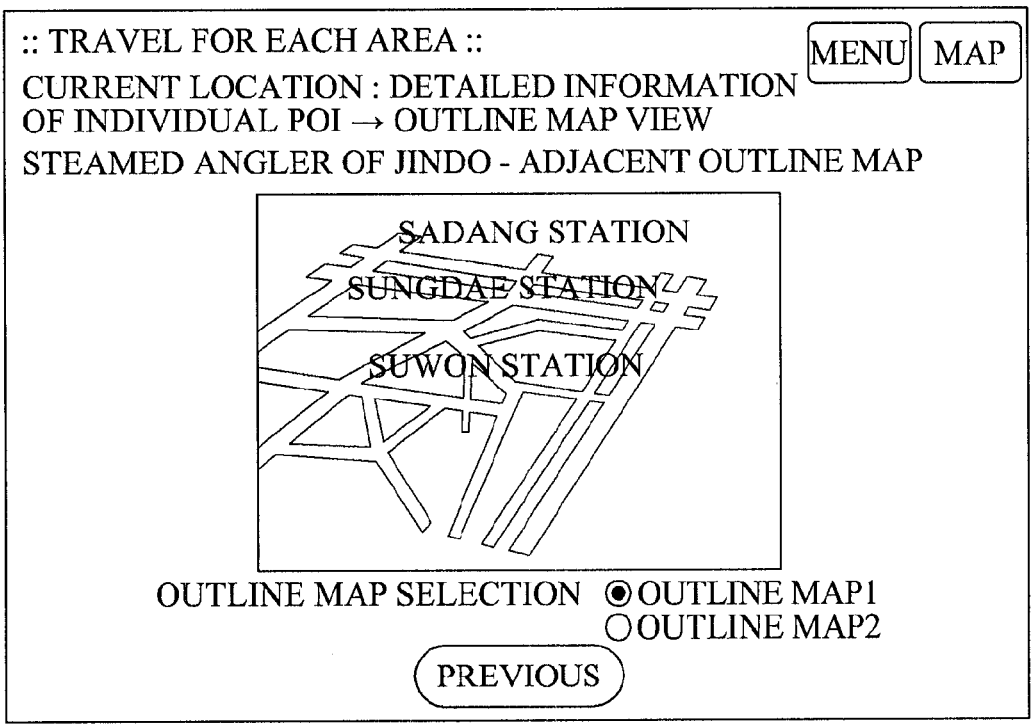
(A)
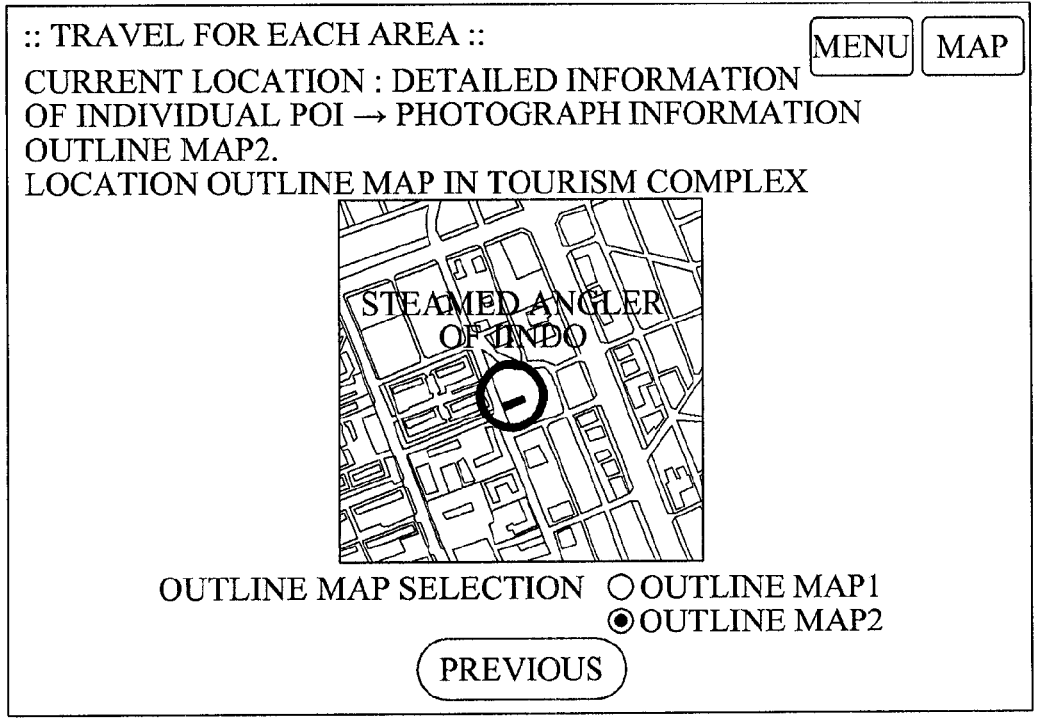
(B)

FIG. 14

:: TRAVEL FOR EACH AREA ::

CURRENT LOCATION : TRIP GENERATION

TRIP NAME SETTING [ SUMMER VACATION TRAVEL IN SEPTEMBER ↓ ]

| SELECTION | INDIVIDUAL TRIP NAME | DISTANCE | ESTIMATED REQUIRED TIME |
|---|---|---|---|
| ☑ | CHARBROILED RIBS OF BOMUN | 25.6KM | ABOUT 3 HOUR 30 MINUTES |
| ☐ | BOMUN THEME WORLD | 25.6KM | ABOUT 3 HOUR 30 MINUTES |
| ☑ | MT. BOMUN NATIONAL PARK | 25.6KM | ABOUT 3 HOUR 30 MINUTES |
| ☑ | STEAMED ANGLER OF MASAN | 25.6KM | ABOUT 3 HOUR 30 MINUTES |
| ☐ | MT. BOMUN NATIONAL PARK | 25.6KM | ABOUT 3 HOUR 30 MINUTES |

(MENU) (MAP)
(TRIP GENERATE)

(DELETION) (MOVE UPWARDS) (MOVE DOWNWARDS) (PREVIOUS) (STORAGE) ← CLICK

FIG. 15

:: TRAVEL FOR EACH AREA ::

CURRENT LOCATION : TRIP I GENERATE

92 TRIPS (COURSES) WHICH I GENERATE — 210

| TRIP NAME | DISTANCE | ESTIMATED REQUIRED TIME |
|---|---|---|
| SUMMER VACATION TRAVEL IN SEPTEMBER | 25km | ABOUT 2 HOUR 30 MINUTES |
| WEDDING ANNIVERSARY | 30km | ABOUT 1 HOUR 20 MINUTES |
| MAPLE-VIEWING TRAVEL FOR PARENTS | 30km | ABOUT 1 HOUR 20 MINUTES |
| TRAVEL FOR FRIEND'S WEDDING CEREMONY | 30km | ABOUT 1 HOUR 20 MINUTES |
| SPINY LOBSTER FESTIVAL IN ANMYEONDO | 30km | ABOUT 1 HOUR 20 MINUTES |
| MAPLE PHOTOGRAPH TRAVEL IN OCTOBER | 30km | ABOUT 1 HOUR 20 MINUTES |

(DELETION) (< PREVIOUS) (INFORMATION VERIFICATION) — 220  (TRIP START) — 230

CLICK

MENU  MAP

FIG. 16

| CURRENT LOCATION : TRAVEL I GENERATE | | | | MENU | MAP |
|---|---|---|---|---|---|
| TRIP NAME CHANGE | SUMMER VACATION TRAVEL IN SEPTEMBER | | | | |
| TRAVEL NOTE | | | | | |

| SELECTION | INDIVIDUAL TRIP NAME | DISTANCE | ESTIMATED REQUIRED TIME |
|---|---|---|---|
| ☑ | 1. CHARBROILED RIBS OF BOMUN | 25.6KM | ABOUT 3 HOUR 30 MINUTES |
| ☐ | 2. BOMUN THEME WORLD | 25.6KM | ABOUT 3 HOUR 30 MINUTES |
| ☐ | 3. MT. BOMUN NATIONAL PARK | 25.6KM | ABOUT 3 HOUR 30 MINUTES |

( PREVIOUS ) ( MOVE DOWNWARDS ) ( MOVE UPWARDS ) ( TRIP MODIFICATION ) ← CLICK ( DELETION ) ( DETAILED VIEW )

TRAVEL INFORMATION SERVICE SYSTEM AND METHOD FOR PROVIDING TRAVEL INFORMATION OF THE SAME SYSTEM

This application is a National Stage of International Application No. PCT/KR2007/006857 filed Dec. 27, 2007 and claims priority Korean Patent Application No. 10-2007-0010972 filed on Feb. 2, 2007, in the Korean Intellectual Property Office, the disclosure of which is incorporated herein in its entirety by reference.

BACKGROUND

1. Technical Field

The present invention relates to a travel information service system, and more particularly, to a travel information service system and a method of providing a travel information service which perform guidance of travel information appropriate for a travel purpose and a travel type.

2. Background Art

Generally, a navigation system (hereinafter, referred to as 'a user terminal') is a system which provides information for driving of a transportation device, such as a vehicle, using artificial satellites. The navigation system is automatic.

The user terminal receives predetermined data from a Global Positioning System (GPS) satellite above the earth using a GPS receiver, and calculates its own location based on the received data.

A plurality of GPS satellites is above the earth, and the user terminal may receive GPS signals from three GPS satellites at any place on the earth and calculate its own location based on the received GPS signals from the three GPS satellites.

The user terminal may provide various information helpful for driving, such as reporting a current vehicle location to a user based on its own calculated location information, calculating an optimum route to a desired destination (routing), performing guidance for the user based on the route, and the like.

Generally, the user terminal internally stores map information about an entire map and point of interest (POI) information denoting famous area information, building information, and road information on the entire map, and utilizes the map information and the POI information as information for optimum route guidance and safe driving.

Currently, users installing and using the above-described user terminal rapidly increase, and since holidays increase due to a five-day workweek and the like, and travels or leisure activities increase, the users increasingly drive with the user terminals installed in vehicles.

However, an existing user terminal is mainly used for providing the user with information for optimum route guidance or for safe driving, while other benefits of the terminal actually do not increase.

Also, many travelers collect related information about travels using travel magazines or the Internet, and the travelers determine which information is appropriate for a destination, which course is selected to travel on based on a desired travel period, and the like, based on the collected information.

The above-described information collection method has a problem that collection of sufficient information about the destination, for example, specific information including an attraction of the destination, accommodations, an entertainment facility, a restaurant, and the like is slightly difficult and complex, and requires much time.

SUMMARY

Technical Goals

The present invention provides a travel information service system which enables a destination and related information of the destination to be easily collected using a user terminal being a navigation system.

The present invention also provides a travel information service system which enables a customized trip schedule considering a situation of a user to be generated using a user terminal.

The present invention also provides a travel information service system which can perform guidance of travel information appropriate for a travel purpose and a travel type.

Technical Solutions

According to an aspect of the present invention, there is provided a travel information service system, the system including: a user terminal to construct a travel information database including a travel course for each area and point of interest (POI) information in an area related to each travel course, provide a user with a menu screen for creating a travel route using information stored in the travel information database, and perform map guidance based on the travel route created by the user.

In an aspect of the present invention, while driving, the user terminal provides travel information of an area corresponding to a driving area from the information stored in the travel information database.

According to another aspect of the present invention, there is provided a method of providing a travel information service, the method including: a first operation of providing a travel course for each area and POI information for each course using a user interface; a second operation of creating a travel route based on user selection of the travel course for each area and the POI information for each course; and a third operation of performing map guidance based on the created travel route.

In an aspect of the present invention, the method further includes: a fourth operation of providing a travel course corresponding to a driving area while driving and the POI information of the corresponding travel course, and performing the map guidance based on the travel course of the driving area according to a user request.

BRIEF DESCRIPTION OF DRAWINGS

FIGS. 4 and 5 illustrate user interface screens for selecting an area and a travel course existing in the area according to an exemplary embodiment of the present invention;

FIGS. 6 through 9 illustrate user interface screens providing detailed information of a travel course for each area according to an exemplary embodiment of the present invention;

FIGS. 11 through 13 illustrate user interface screens providing detailed information of individual POI information according to an exemplary embodiment of the present invention;

FIG. 14 illustrates a user interface screen of a trip generation process with respect to individual POI information selected by a user according to an exemplary embodiment of the present invention;

FIGS. 15 through 20 illustrate user interface screens of an execution process with respect to a user-customized trip according to an exemplary embodiment of the present invention;

DETAILED DESCRIPTION OF THE ILLUSTRATED EMBODIMENTS

Hereinafter, a travel information service system and a method of providing a travel information service according to the present invention are described with reference to the attached drawings.

First, the travel information service system according to the present invention is described.

Figure 1:
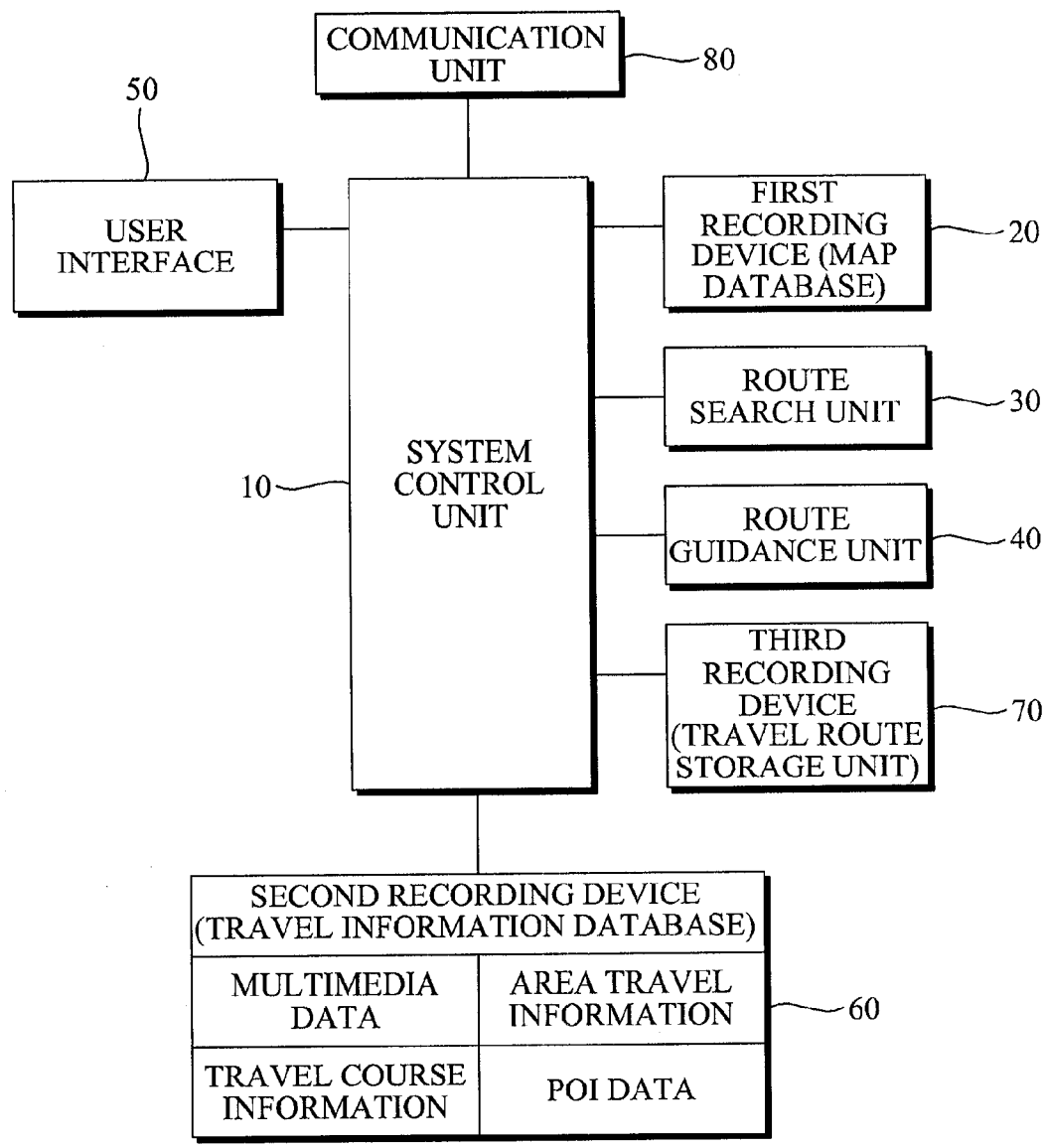
FIG. 1 is a diagram illustrating an entire configuration of a travel information service system according to an exemplary embodiment of the present invention.

FIG. 1 is a diagram illustrating a configuration of a user terminal providing a travel information service system according to an exemplary embodiment of the present invention.

The user terminal of the present invention includes a route guidance system and a travel information service system, performs route guidance, and provides travel information under control of a system control unit 10.

As illustrated in FIG. 1, the route guidance system of the user terminal includes a first recording device 20, a route search unit 30, a route guidance unit 40, and a user interface 50.

The first recording device 20 is a map database of recording road map data and route guidance data associated with the road map data.

A user selects a desired destination for route guidance using the user interface 50.

The route search unit 30 verifies a current location of a vehicle using Global Positioning System (GPS) signals received by a GPS receiver (not illustrated). Also, the route search unit 30 searches for a route from the current location to the destination selected by the user using the road map data stored in the first recording device 20, and generates route information.

The route guidance unit 40 performs the route guidance for the user based on the route information generated by the route search unit 30.

Also, as illustrated in FIG. 1, the travel information service system of the user terminal generally includes the user interface 50, a second recording device 60, and a third recording device 70.

The second recording device 60 is a travel information database including a travel course for each area, individual point of interest (POI) information for each course, detailed information about the travel course and the individual POI information, and related multimedia data.

The travel information database includes travel course information, area travel information, POI data, and the multimedia data.

In this instance, the travel course information may be acquired by collecting the travel course in each area using a professional material, a journal, a related organization, and an enterprise. Also, the area travel information may be provided from a regional organization or a professional travel agency, or may be collected by itself.

The POI data is a collection of the individual POI information existing in each area for each area, and the multimedia data includes an image, an illustrated map, a movie, text-to-speech (TTS) data related to the travel course or the individual POI information, and the like.

The user terminal may access a web server (not illustrated) providing and managing various information using a communication unit 80, download and collect the travel information, and update the information.

Also, the third recording device 70 includes a memory for storing a travel route directly created by the user using travel information stored in the second recording device 60. The third recording device 70 provides a menu screen including the travel information stored in the second recording device 60 using the user interface 50 so that the user may set the travel route appropriate for his/her own travel purpose or a situation.

A route is retrieved to the destination selected by the user based on the travel information stored in the second recording device 60 or the travel route stored in the third recording device 70 according to a request of the user, and the route guidance is performed based on the retrieved route.

Hereinafter, a process of generating a customized trip by a user according to an exemplary embodiment of the present invention is described.

Figure 2:
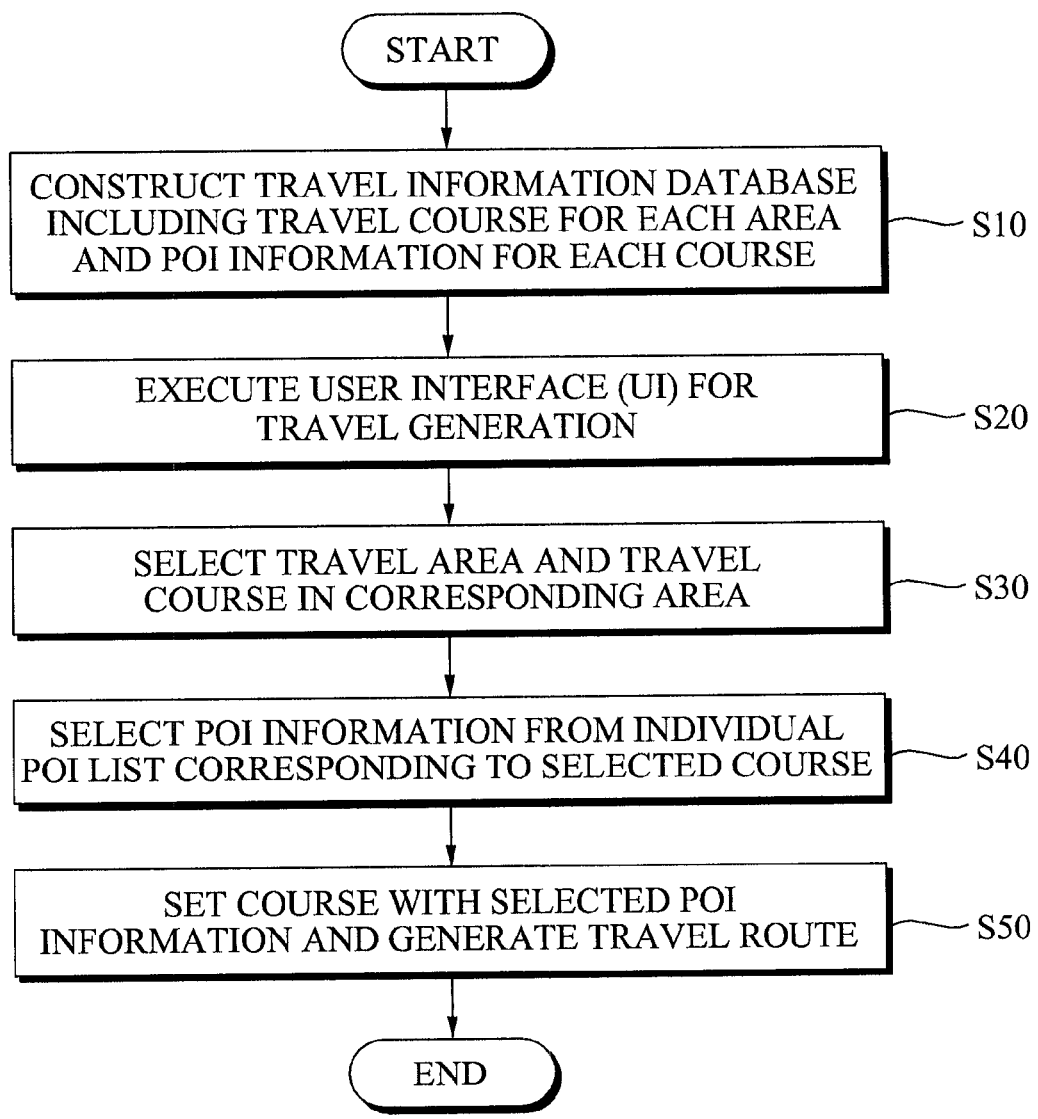
FIG. 2 is a flowchart illustrating a process of generating a user-customized trip for providing a travel information service according to an exemplary embodiment of the present invention.

FIG. 2 is a flowchart illustrating a process of generating a user-customized trip for providing a travel information service according to an exemplary embodiment of the present invention.

First, as described above, in operation S10, a travel information database including a travel course for each area and POI information for each course, and related multimedia data is constructed in order to provide the travel information service of the present invention.

In operation S20, a user interface is executed so that a user may generate 'a customized trip' using a user terminal including the travel information database.

In operation S30, the user executes a menu for setting 'the customized trip' using the user interface, and selects a travel area and a travel course in the corresponding area using the executed menu screen.

In this instance, when the user selects a specific travel course from the menu screen of the user interface, a predetermined individual POI list is displayed on the corresponding travel course, and the user selects at least one piece of POI information to be designated as the user's own customized travel course from the displayed POI list using the menu screen in operation S40.

In operation S50, when a storage instruction of the user with respect to the selected POI information is inputted, the user sets a course with the selected POI information and generates a travel route corresponding to the customized trip.

Accordingly, the user terminal stores the travel route of the customized trip generated using the above-described process in the third recording device 70, and performs map guidance based on the customized travel route stored in the third recording device 70 when a request of the user exists.

Hereinafter, a user interface screen for generating the customized trip and a process of generating the customized trip are described in detail.

Figure 3:
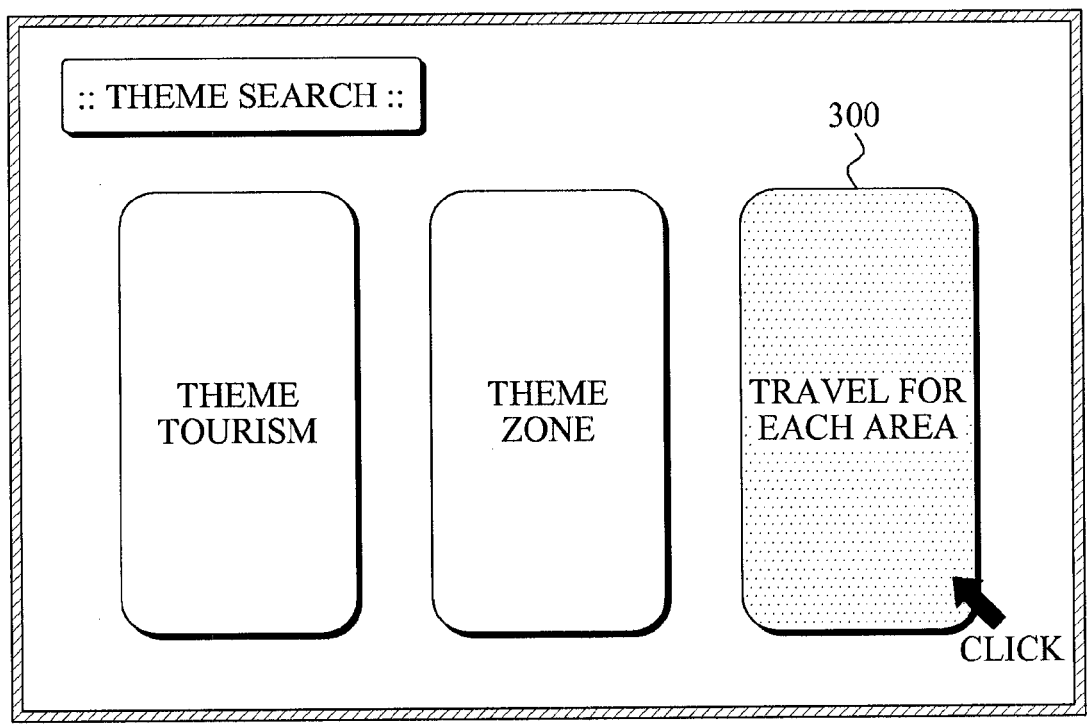
FIG. 3 illustrates a user interface screen including a 'travel for each area' menu for generating a user-customized trip according to an exemplary embodiment of the present invention.

First, FIG. 3 illustrates an access screen to a 'travel for each area' menu for generating a customized trip according to an exemplary embodiment of the present invention.

The 'travel for each area' menu may designate its location in a group which a menu type or a menu character is similar. For example, as illustrated in FIG. 3, a 'travel for each area' menu 300 may be included as a lower menu list of a 'theme search' menu.

When the 'travel for each area' menu 300 is selected from the 'theme search' menu list, a user interface for generating the customized trip may be executed. When a user selects the 'travel for each area' menu 300, a corresponding menu screen is displayed, and the user may select a travel area and a travel course in the corresponding area using the menu screen with respect to the 'travel for each area'.

Figure 5:
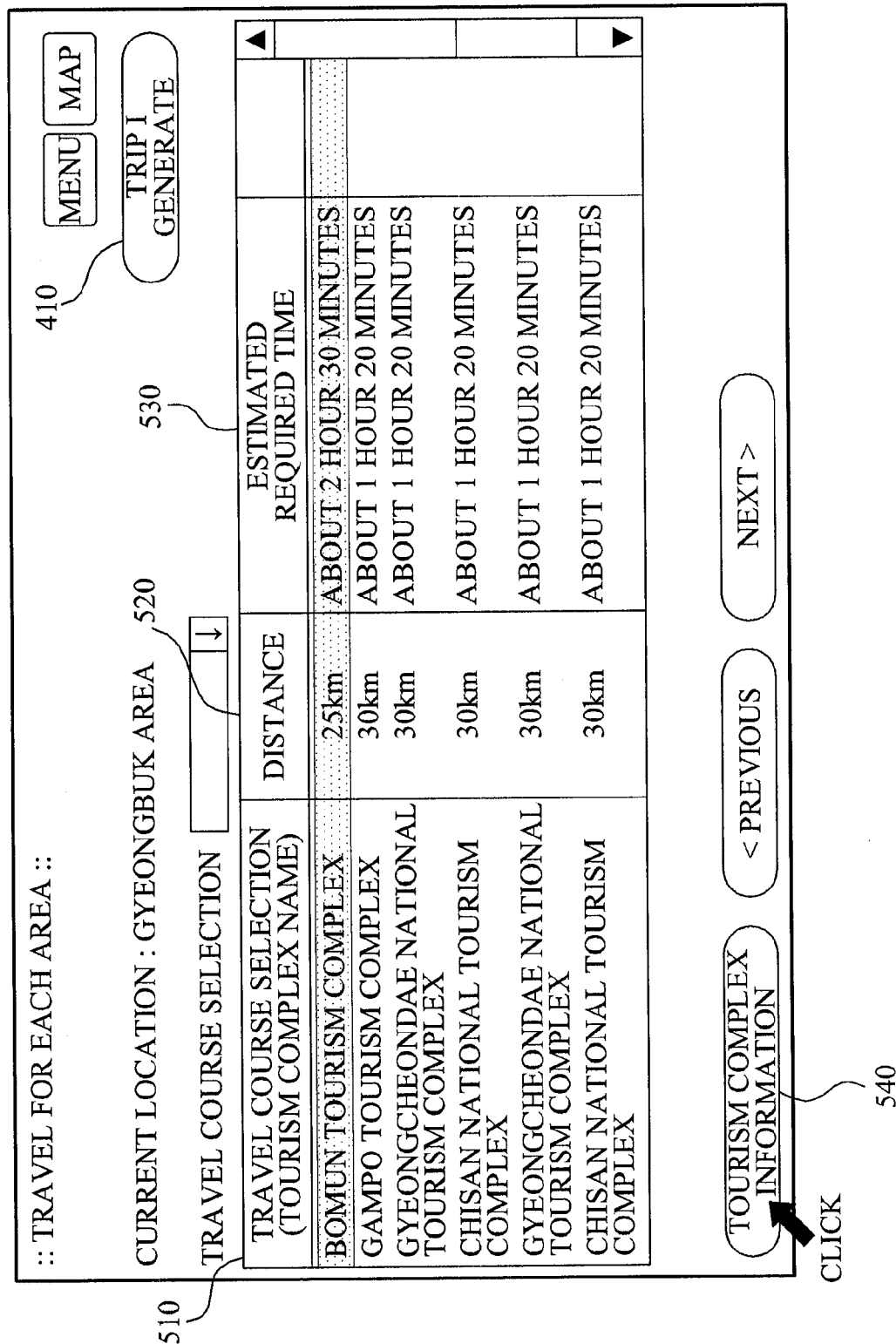

FIG. 4 illustrates an example of area selection menu screens according to an exemplary embodiment of the present invention, and FIG. 5 illustrates an example of course selection menu screens according to an exemplary embodiment of the present invention.

As illustrated in FIG. 4, an area selection menu screen is provided so that a user may select a travel area. The area selection menu may provide an area selection menu 400 as a national map form (FIG. 4 part (A)), and provide an area selection menu 420 using a text icon for each area (FIG. 4 part (B)).

When a specific area is selected using the area selection menu screen, the course selection menu screen that may be used to select a travel course in the selected area is provided as a lower menu of the area selection menu.

The course selection menu provides at least one travel course, and each travel course sets courses with at least two destinations and provides the courses.

As illustrated in FIG. 5, when a user selects 'Gyeongbuk area' using the area selection menu of FIG. 4, a travel course list corresponding to 'Gyeongbuk area' is provided.

The course selection menu screen provides a travel course list of a corresponding area 510, a distance remaining in a travel course 520, and an estimated remaining time 530. The distance remaining in the travel course 520 and the estimated remaining time 530 denote a remaining distance and a remaining time from a current location to a first destination included in the corresponding travel course.

Also, the course selection menu screen further includes a detailed information icon 540 movable to the menu screen providing detailed information for each travel course, for example, 'tourism complex information', so that a user may select the desired travel course with reference to detailed travel information about the travel course.

FIGS. 6 through 9 illustrate menu screens providing detailed information of each travel course according to an exemplary embodiment of the present invention.

Figure 6:
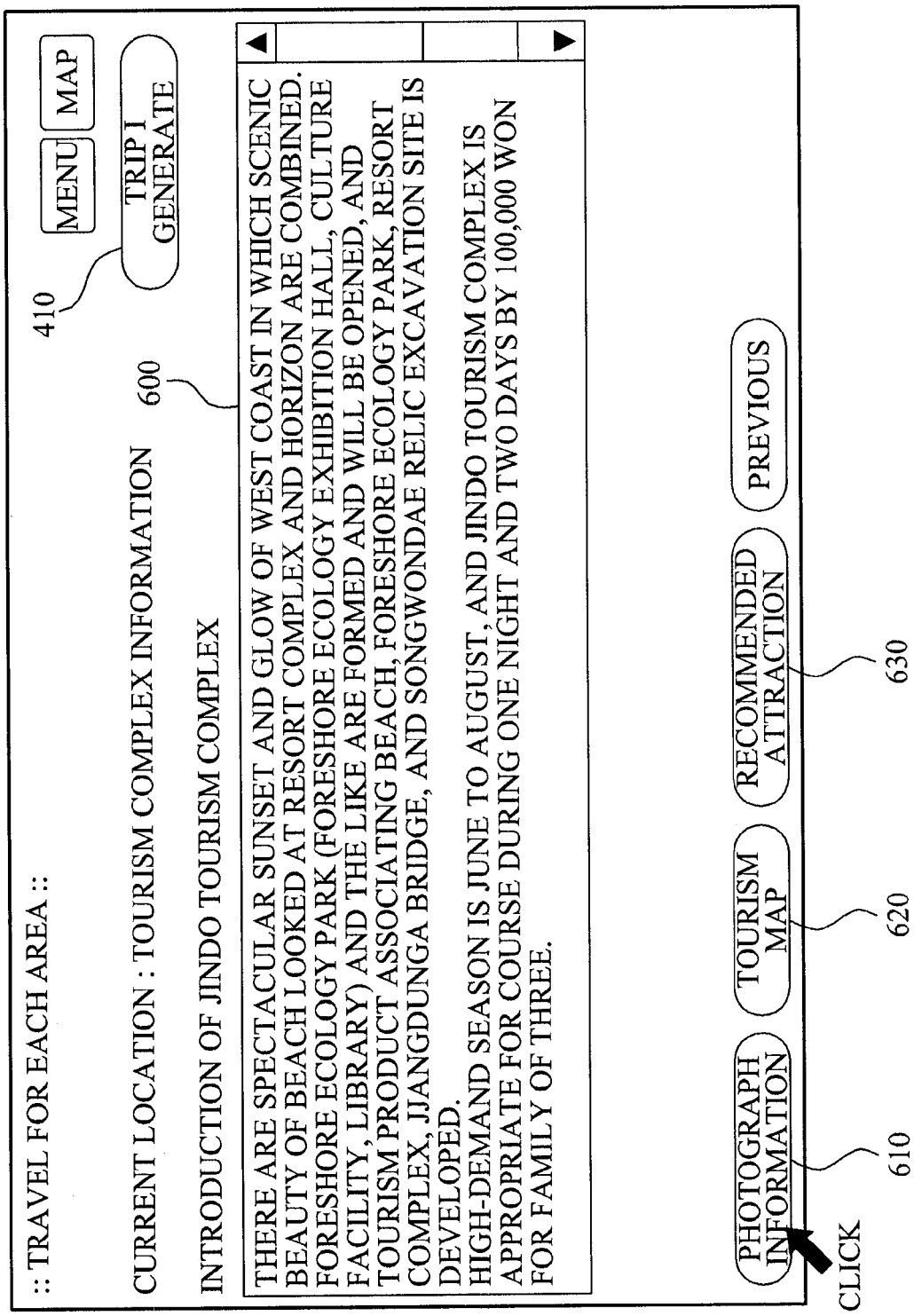

When a user selects the detailed information icon 540 after selecting a specific travel course in the menu screen of FIG. 5, a detailed information providing screen illustrated in FIG. 6 is displayed.

The detailed information providing screen includes an introduction section 600 for introducing a destination of the travel course selected by the user, and further includes each information icon accessing a view screen of photograph information 610, a tourism map 620, and a recommended attraction 630 related to the travel course.

Figure 7:
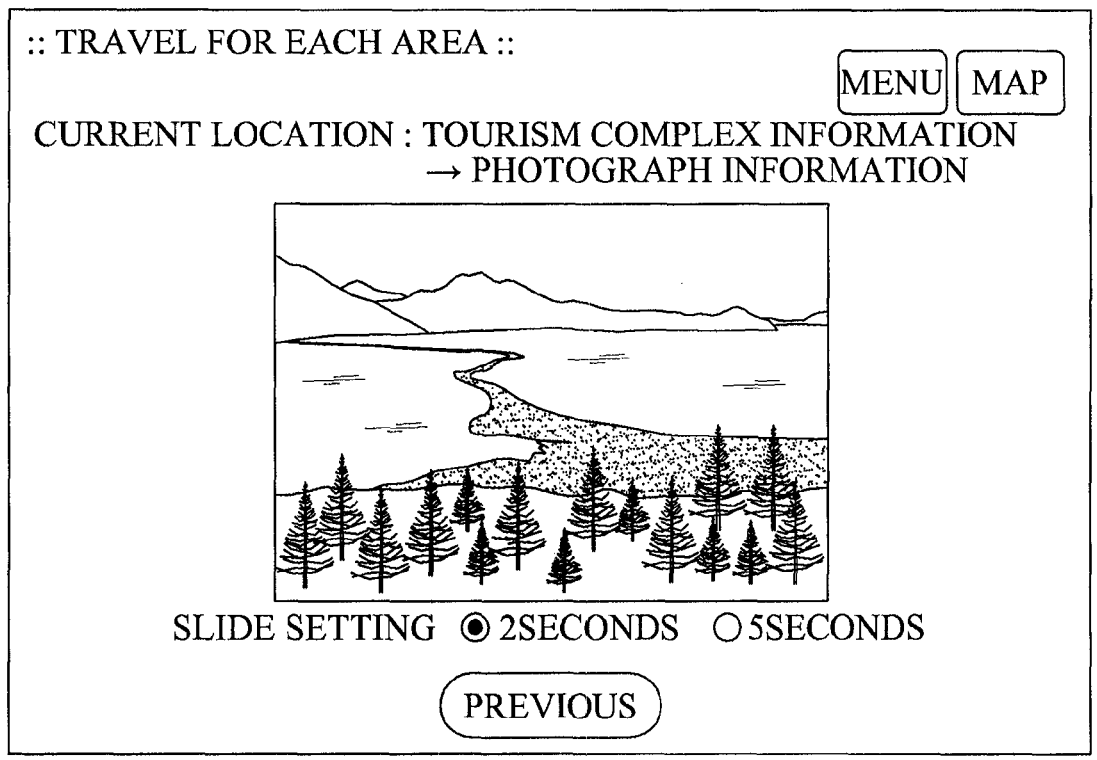

When the photograph information icon 610 is selected from the detailed information providing screen of FIG. 6, a photograph and an image related to the corresponding travel course are provided as illustrated in FIG. 7.

The photograph information includes at least two photographs or images, and displays the at least two photographs or images on a screen or embodies the at least two photographs or images as a slide show type. The photograph information may include a movie.

Figure 8:
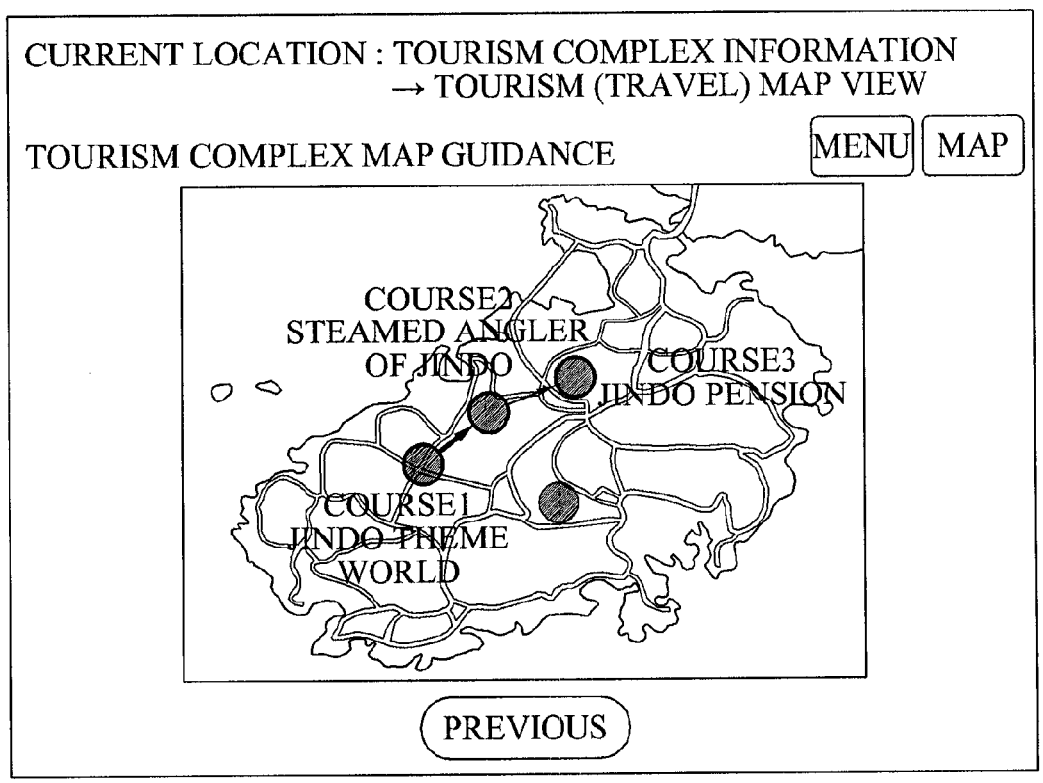

When the tourism map icon 620 is selected from the detailed information providing screen of FIG. 6, an entire area corresponding to the travel course is provided as an illustrated map so that the corresponding travel course may be verified at a glance as illustrated in FIG. 8.

The travel map may mark all POI information of the corresponding travel course or recommended POI information, and a movement route proposed by the travel course may be provided by a connection between POI information using an arrow and the like.

When the recommended attraction icon 630 is selected from the detailed information providing screen of FIG. 6, an individual destination corresponding to the travel course, that is, a POI information list designated as a recommended attraction from among POI information is provided as illustrated in FIG. 9.

The recommended attraction providing screen provides a recommended POI information list 920, a selection section 910 individually selecting the POI information, and a distance remaining to the destination 930 and an estimated remaining time 940 corresponding to each POI information.

The recommended attraction providing screen further includes each information icon accessing screens of a detailed view 950 related to individual POI information and a location view 960.

The recommended attraction providing screen further includes an icon 970 accessing a trip generation menu screen that may select at least one recommended POI from the recommended POI information list and may generate a customized trip.

Hereinafter, screens of providing detailed information of the individual POI information and travel generation are described.

Accordingly, as described with reference to FIGS. 4 through 9, a specific travel course to travel may be selected after referring to the detailed information about each travel course.

In FIG. 5 again, when a user selects the specific travel course, an individual POI information (an individual destination) list corresponding to the selected travel course is provided.

Figure 10:
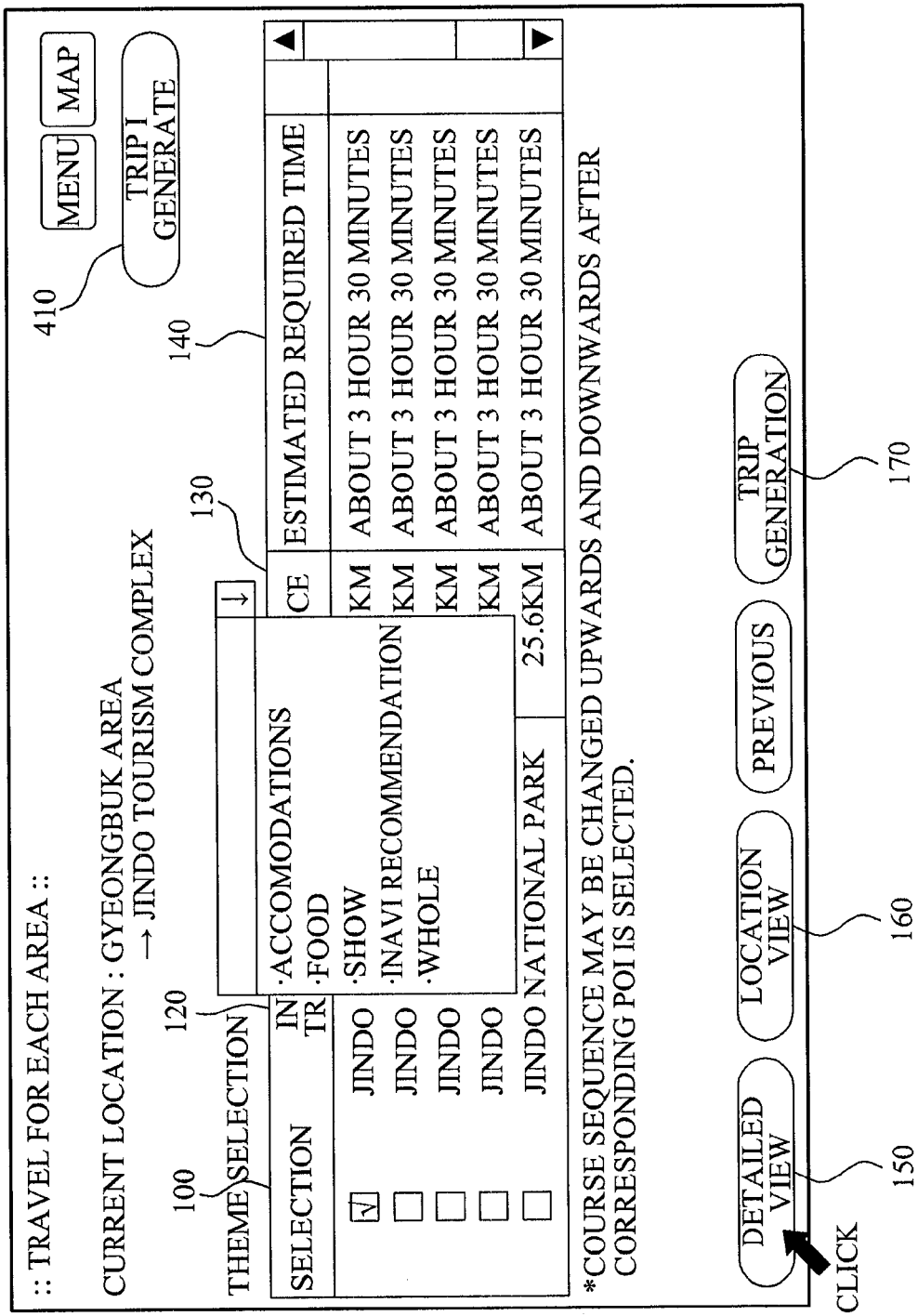
FIG. 10 illustrates a user interface screen for selecting an individual point of interest (POI) list existing in a specific travel course according to an exemplary embodiment of the present invention.

FIG. 10 illustrates a menu screen including a POI information list designated in a specific travel course according to an exemplary embodiment of the present invention.

The POI information menu screen provides a POI information list 120 corresponding to a travel course selected by a user, a selection section 110 for individually selecting the POI information, and a distance remaining to a destination 130 and an estimated remaining time 140 corresponding to each POI information.

The POI information menu screen may further include a theme selection section 100 with respect to the POI information, may classify the POI information by a theme of information, for example, accommodations, food, a show, a recommended attraction, and the like, and may optionally provide the POI information list corresponding to the theme selected by the user.

The POI information menu screen further includes an information icon corresponding to a detailed view 150 and a location view 160 in order to provide detailed information related to an individual POI.

Figure 12:
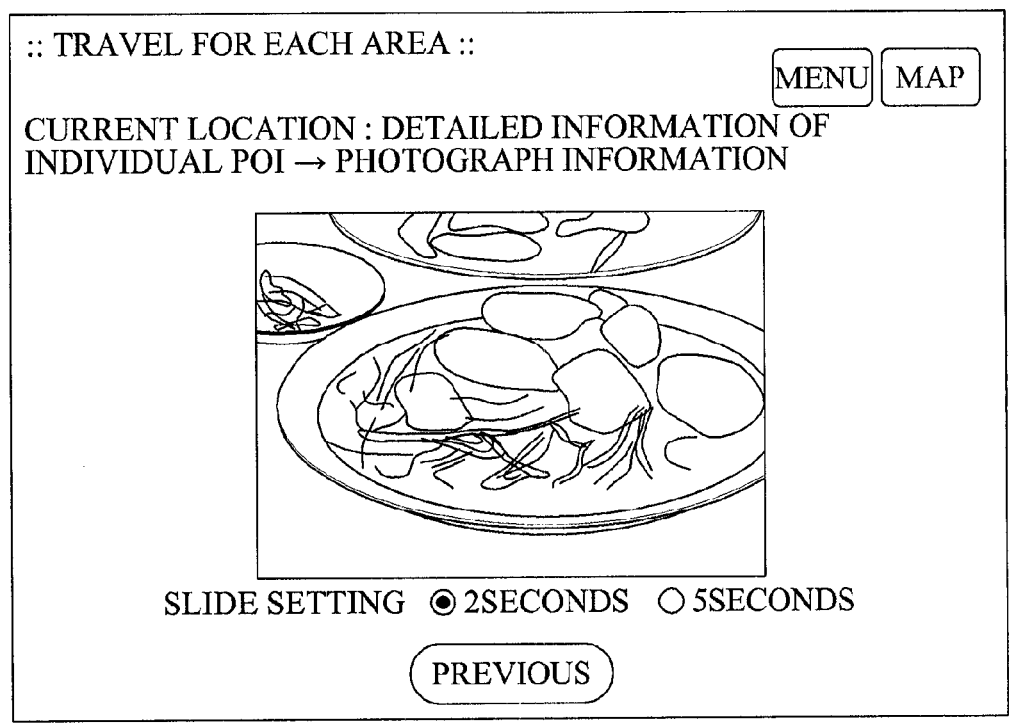

FIGS. 11 through 13 illustrate menu screens for providing detailed information of individual POI information according to an exemplary embodiment of the present invention.

When a user selects the detailed view icon 150 after selecting specific POI information from the menu screen of FIG. 10, the detailed information providing screen illustrated in FIG. 11 is displayed.

The detailed information providing screen includes an introduction section 151 of a destination corresponding to the POI information selected by the user, and further includes each information icon accessing photograph information 152 related to the POI information, and an outline map view 153.

When the photograph information icon 152 is selected from the detailed information providing screen of FIG. 11, a photograph and an image related to the corresponding POI information are provided as illustrated in FIG. 12.

The photograph information includes at least two photographs or images, and displays the at least two photographs or images on a screen or embodies the at least two photographs or images as a slide show type. The photograph information may include a movie.

When the outline map view icon 153 is selected from the detailed information providing screen of FIG. 11, an outline map image is provided to verify a destination location of the corresponding POI information at a glance as illustrated in FIG. 13.

The outline map view may generate and provide an outline map image by a scheme of marking surrounding information thereby encircling the destination location of the corresponding POI information (FIG. 13 part (A)), or a scheme of marking the POI location of the corresponding travel course (FIG. 13 part (B)).

The POI information menu screen further includes an icon 170 accessing a travel generation menu screen that may select at least one piece of POI information from an individual POI list and generate a customized trip.

Hereinafter, a travel generation-providing screen based on a selection of the individual POI is described.

Accordingly, as described with reference to FIGS. 10 through 13, an individual destination to travel to may be selected after referring to detailed information of individual POI information.

Hereinafter, a travel generation process based on the selection of the individual POI in menu screens of FIG. 9 and FIG. 10, and a travel generation-providing screen are described.

When a user selects travel generation icons 970 and 170 after selecting at least one piece of POI information in the menu screens of FIG. 9 and FIG. 10, the travel generation-providing screen illustrated in FIG. 14 is displayed.

The travel generation-providing screen provides a name input section 171 for setting a trip name, an individual POI information list 173, a selection section 172 to individually select the POI information, and a distance remaining to a destination 174 and an estimated remaining time 175 corresponding to each POI information.

The travel generation-providing screen further includes a deletion icon for deleting individual POI information and a storage icon with respect to the selected POI information.

The user inputs a trip name of a travel route being generated using the trip name input section 171 in the travel generation-providing screen, and inputs the storage icon after selecting at least one piece of POI information from the individual POI information list 173 using the selection section 172.

The POI information selected by the user sets a course based on an input of the storage icon and is stored as a customized travel route by setting the trip name inputted using the trip name input section 171 as a file name. In this instance, the setting the course with the POI information may determine a route movement order between POIs based on an order by which the user selects the POI information, or a short distance order between the POI information selected by the user.

For example, when the user selects 'Bomum tourism complex' from the menu screen of FIG. 5 as a travel course after selecting 'Gyeongbuk' as a travel area in the menu screen of FIG. 4, the travel generation-providing screen is provided with a destination list in 'Bomum tourism complex' as illustrated in FIG. 14. When the user inputs the travel name as 'summer vacation trip in September' using the menu screen of FIG. 14, and selects the POI information based on an order of 'charbroiled ribs of Bomun→Mt. Bomun national park→steamed angler of Masan', a customized trip 'summer vacation trip in September' having the route movement order similar to the selection order is generated.

The customized trip directly generated by the user using the user interface is stored in a terminal and a customized travel list stored in the terminal is provided according to a request of the user.

The user interface generates a menu accessing the customized travel list, for example, a menu 'trip generate', and provides the customized travel list when selecting the corresponding menu.

The menu 'trip I generate' (a reference number 410 in FIG. 4 and the like) may be exposed on a predetermined location of general service screens or the menu screen in order to improve a use convenience and a use frequency.

FIGS. 15 through 20 illustrate user interface screens provided during a process of executing route guidance of a customized trip according to an exemplary embodiment of the present invention.

When a user selects the menu 'trip I generate', a customized travel list 210 generated by the user is provided as illustrated in FIG. 15.

The menu screen of FIG. 15 includes an information verification icon 220 for verifying a destination configuration of each customized trip, and a trip start icon 230 to request a driving and guidance start for the selected customized trip.

When the specific customized trip is selected from the menu screen of FIG. 15 and the information verification icon 220 is selected, a menu screen including a destination list of the corresponding customized trip is provided as illustrated in FIG. 16.

The information verification menu screen may provide a trip modification icon to modify a course, delete a destination, and the like, and a detailed view icon to provide detailed information about each destination.

Figure 17:
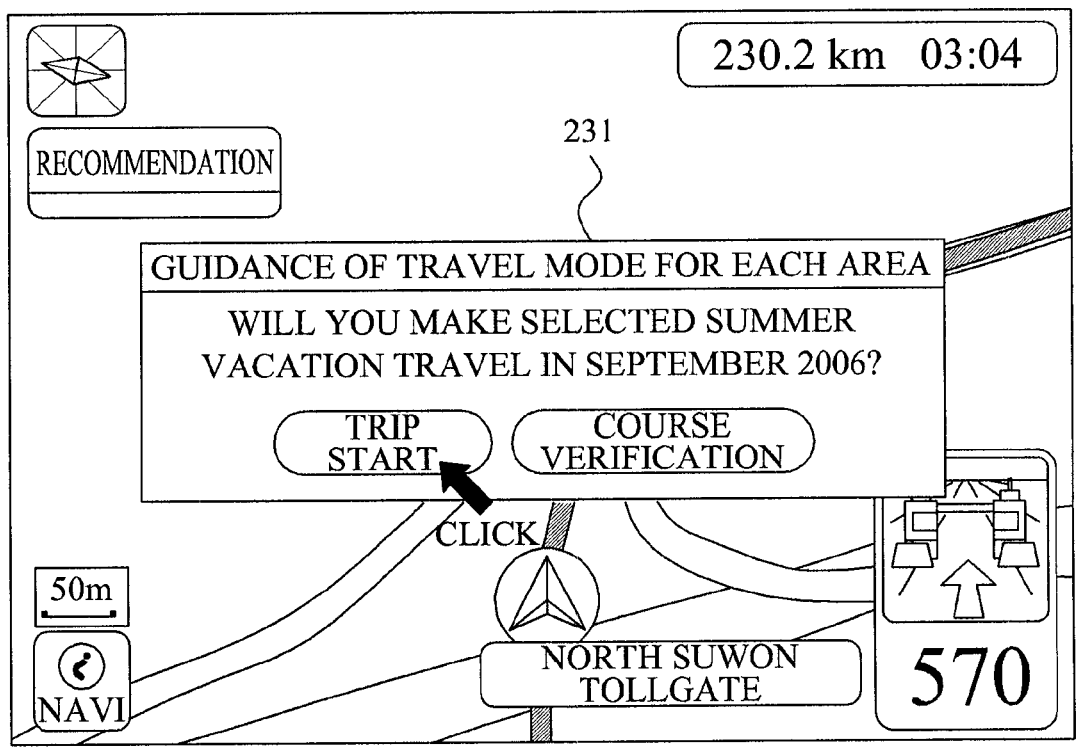

When the specific customized trip is selected from the menu screen of FIG. 15 and the travel start icon 230 is inputted, a report message screen 231 with respect to a travel start of the customized trip selected by the user is provided as illustrated in FIG. 17.

The report message screen 231 may further include a course verification icon to verify a course of the customized trip selected by the user before starting the travel.

Figure 18:
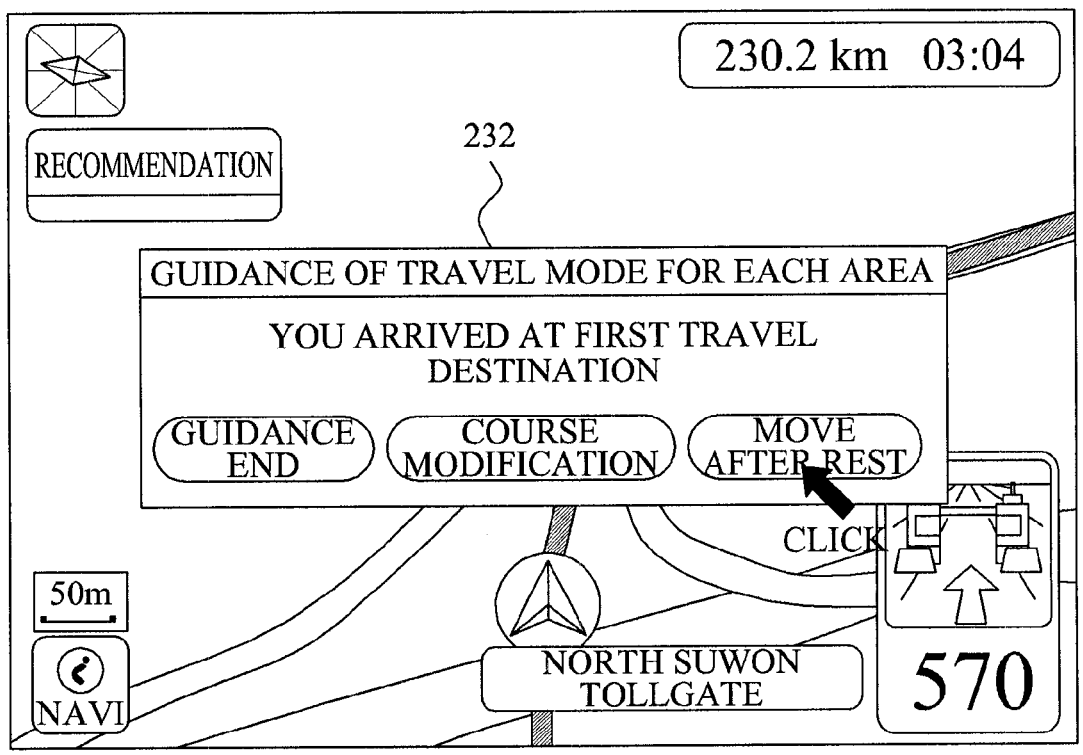

When the user verifies a report message using the report message screen 231 and inputs a travel start instruction, map guidance starts based on a route designated in the corresponding customized trip. When the user arrives at a first destination of the customized trip during a map guidance process, an arrival report message screen 232 is subsequently provided as illustrated in FIG. 18.

The arrival report message screen 232 may include a guidance end icon to end a map guidance service of the customized trip regardless of any remaining destinations, a course modification icon to verify a remaining course or to modify a course of a remaining destination, and a move after rest icon for directing guidance to a next destination.

Figure 19:
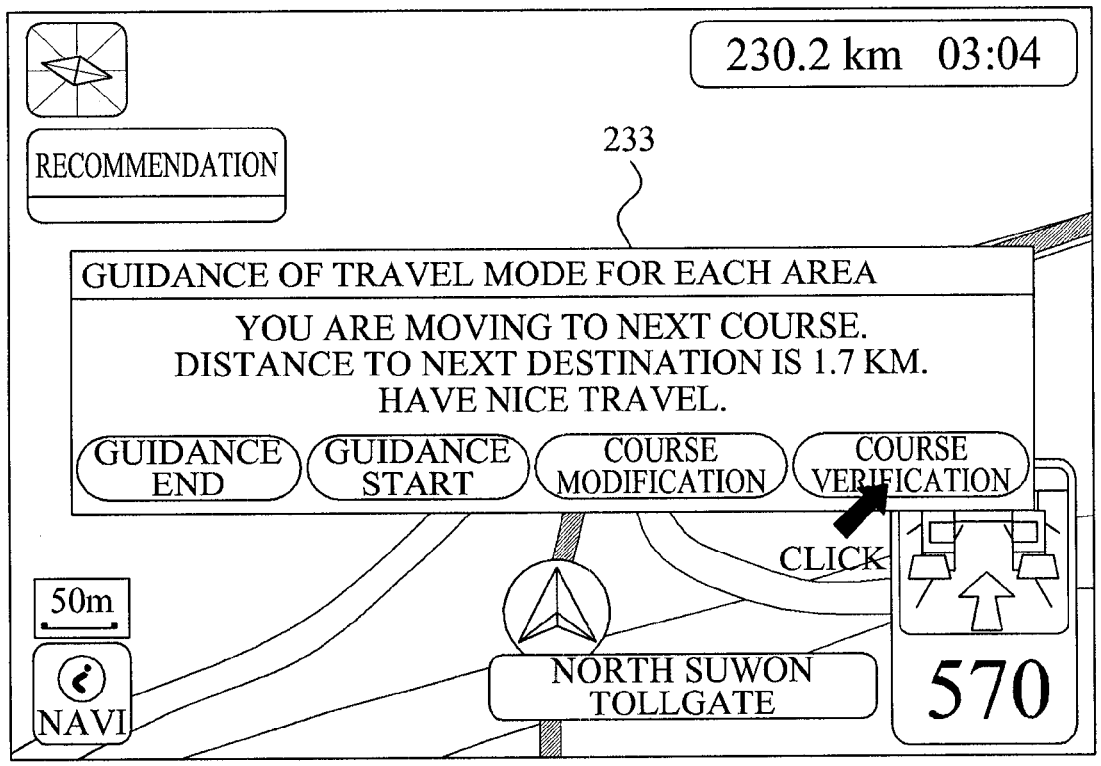

When the user selects the move after rest icon from the arrival report message screen 232, a message screen 233 reporting a destination to move to next is provided as illustrated in FIG. 19.

The next course report message screen 233 may include a guidance end icon to end a map guidance service of a customized trip regardless of any remaining destinations, a guidance start icon to instruct a guidance start to a next destination, a course modification icon to verify a remaining course or to modify a course of a remaining destination, and a course verification icon to verify a current location and map information about a next destination.

Figure 20:
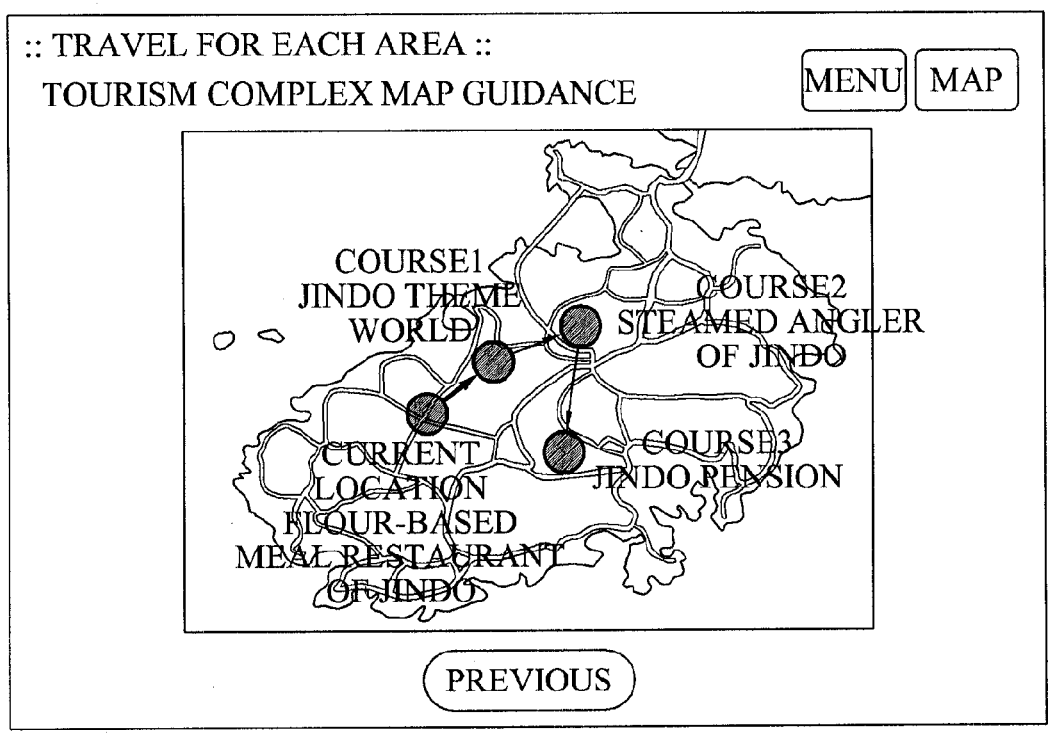

When the course verification icon is selected, a map image denoting a current location, a location of a next destination, and the like is provided as illustrated in FIG. 20.

According to the present invention, the user may set a course with the destination selected by the user, generate a customized trip, and provide a route guidance service based on the customized travel generated by the user.

Also, the route guidance service based on the user-customized travel and travel information corresponding to a driving area while driving may be provided, and the route guidance service may be provided based on a travel course of a corresponding area.

Figure 21:
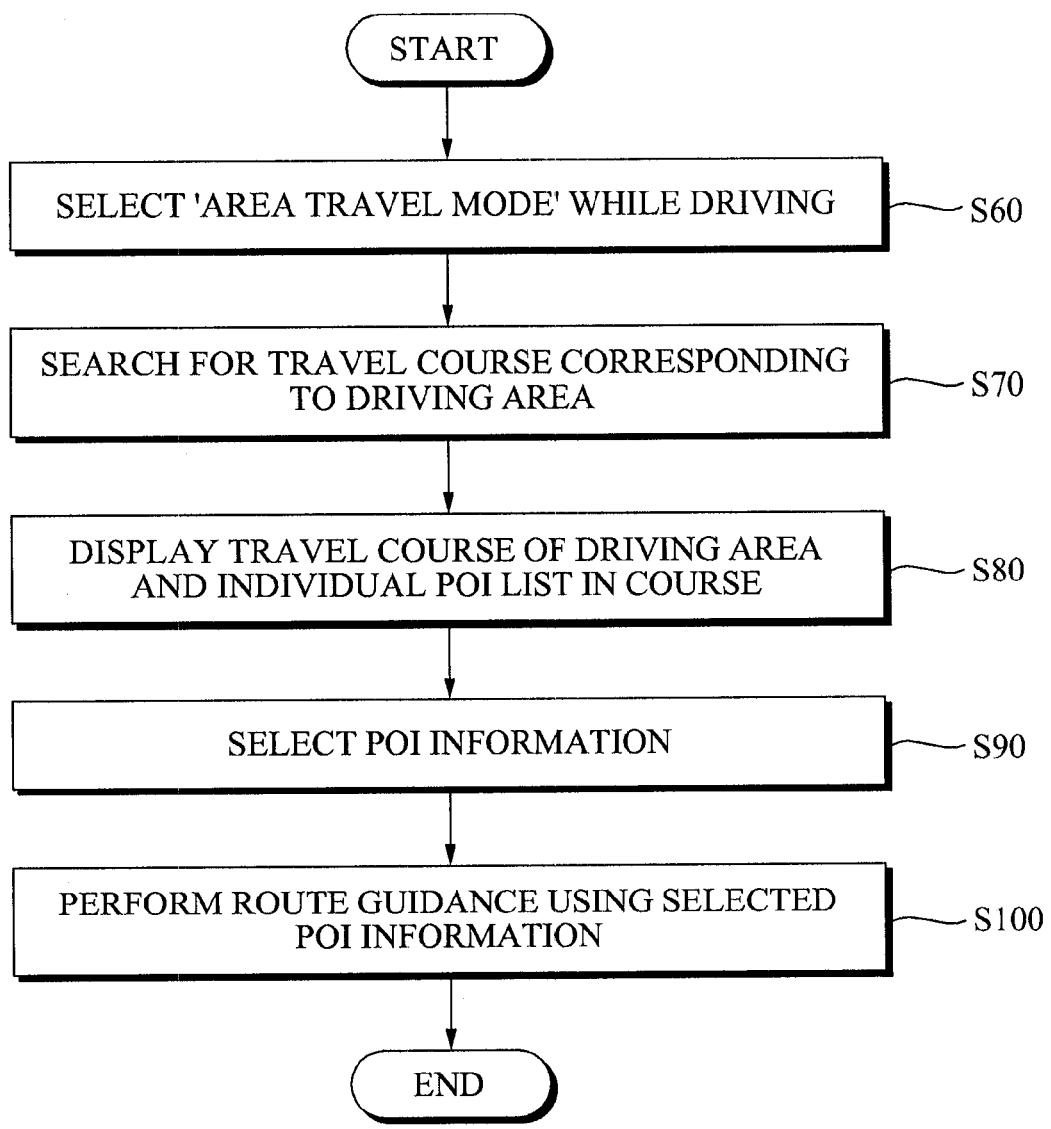
FIG. 21 illustrates a travel course guidance process of a driving area while driving according to an exemplary embodiment of the present invention.

FIG. 21 illustrates a travel course guidance service process of a driving area while driving according to an exemplary embodiment of the present invention.

A user terminal provides a user with a route guidance service for providing information related to optimum route guidance to a predetermined destination or for safe driving.

In operation S60, the user selects 'an area travel mode' while driving using the route guidance service.

Figure 22:
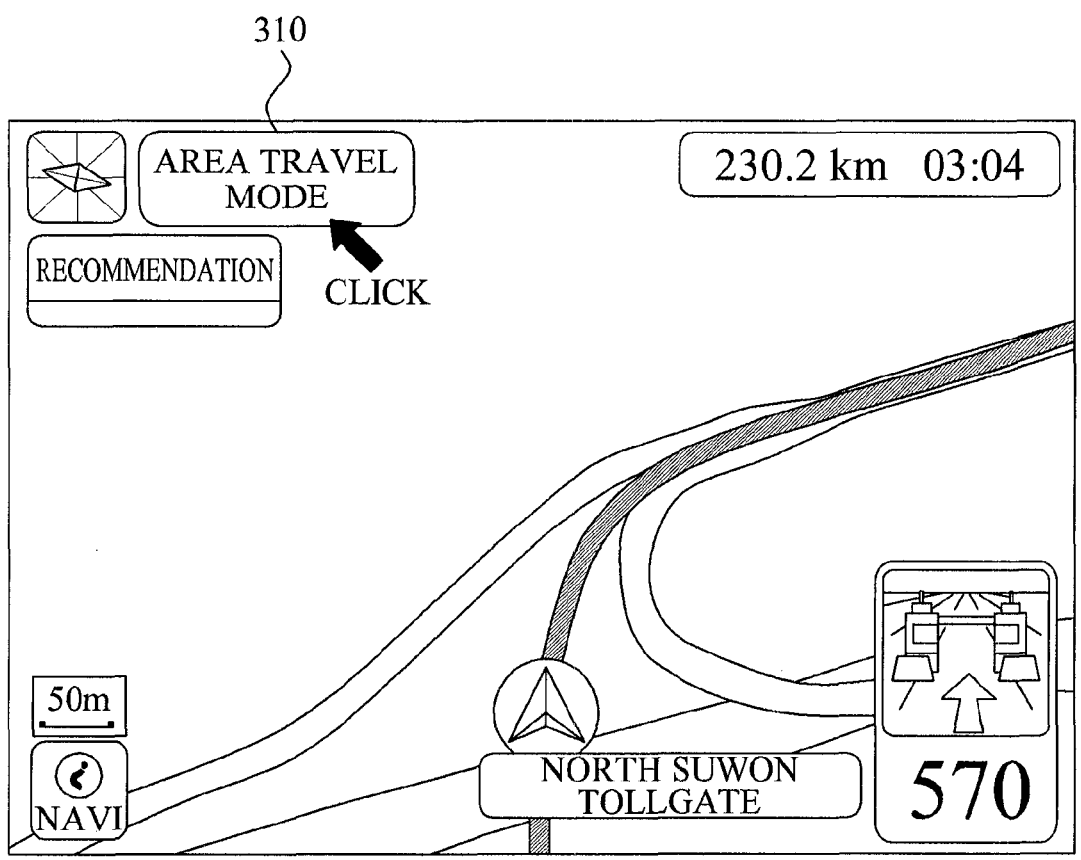
FIGS. 22 and 23 illustrate user interface screens for travel course guidance of a driving area according to an exemplary embodiment of the present invention.

As illustrated in FIG. 22, according to the present invention, an 'area travel mode' menu 310 may be exposed on all service screens for route guidance.

In operation S70, when the user selects 'the area travel mode' using the route guidance service screen, travel information corresponding to a current-driving area is retrieved from a travel information database after verifying a current location.

In operation S80, the travel information existing in the driving area, that is, a travel course of a corresponding area and an individual POI list in the course are provided based on the search result.

Figure 23:
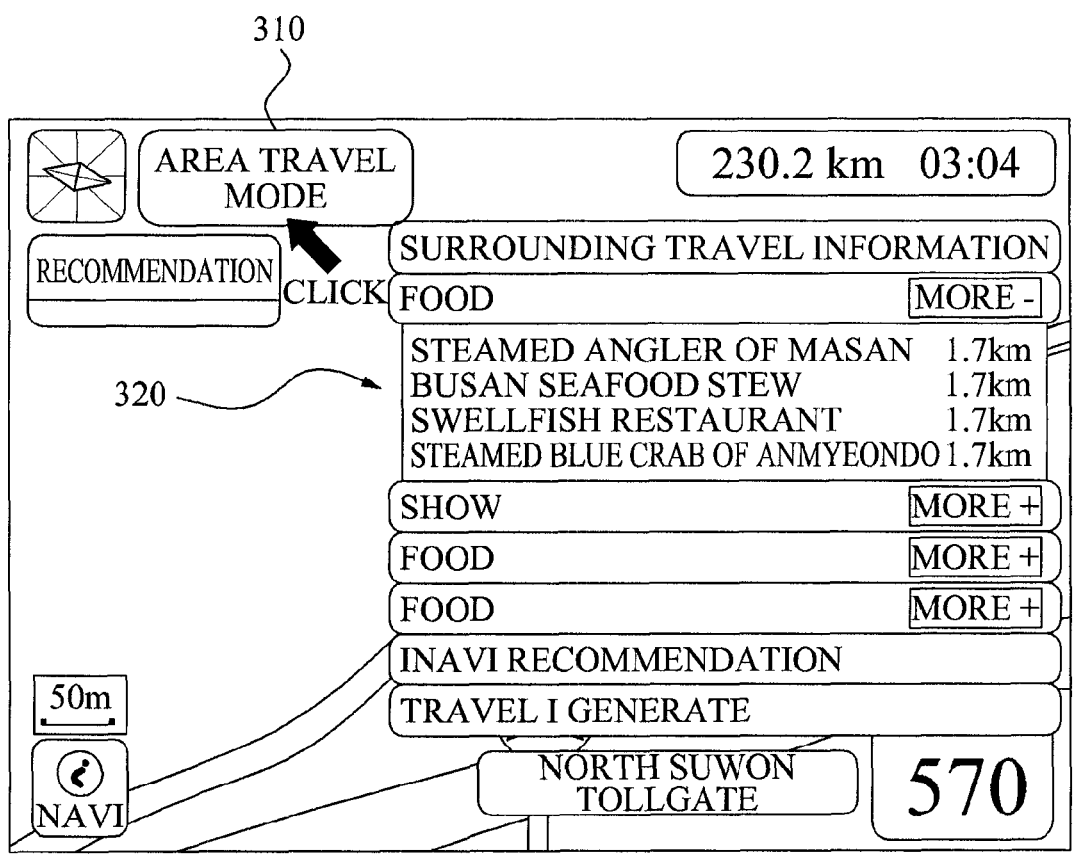

FIG. 23 illustrates a menu screen providing travel information of a driving area on a route guidance service screen according to an exemplary embodiment of the present invention, and illustrates a destination (an individual POI) list screen 320 classified by a travel theme. For example, when a directory including a theme name, for example, food, a show, and the like is displayed in a predetermined location of the route guidance service screen, and the specific directory is selected, the individual POI list in the corresponding directory is ordered and displayed.

When the user selects, from the POI list, a destination to move to in operation S90, a destination for route guidance is designated as the destination selected by the user, and the route guidance service to the corresponding destination is performed in operation S100.

The present invention may provide travel information of a driving area while driving using the route guidance service.

The method of providing the travel information service according to the exemplary embodiments of the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

A travel information service system and a method of providing a travel information service according to the present invention have following effects.

First, a travel course for each area and an individual destination for each course are provided with detailed information of each destination for a terminal, thereby improving a user convenience in searching for the destination and collecting travel information.

Second, a user may directly set a course with a destination and create a travel course, thereby providing an optimized travel guidance service based on a travel purpose or a travel type.

Third, travel information corresponding to a driving area while driving may be provided, thereby extending benefits of a user terminal.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. Therefore, it is intended that the scope of the invention be defined by the claims appended thereto and their equivalents.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A travel information service system, the system comprising:
a travel information database including a plurality of travel courses for each area and a plurality of point of interest (POI) information related to each travel course;
a user interface to provide a user with a menu screen for creating a travel route using information stored in the travel information database and a selection type menu screen including an area list, a travel course list for each area, and a POI information list for each travel course;

a route search unit, when the user selects a specific area from the area list provided by the menu screen, a specific travel course from the travel course list corresponding to the selected area and at least one piece of POI information from the POI information list corresponding to the selected travel course to be designated a specific travel course from the menu screen, to set a course with the selected POI information and create the travel route;

a travel route storage unit to store the travel route; and a route guidance unit to perform map guidance based on the travel routebased on user selection of the travel course for each area and the POI information for each course.

2. The system of claim 1, wherein the travel information database collects or updates the travel information from a web server managing various information provided for the user terminal.

3. The system of claim 2, wherein the travel information database further includes detailed information about individual POI information and related multimedia data.

4. The system of claim 1, wherein, while driving, the route guidance unit provides travel information of an area corresponding to a driving area from the information stored in the travel information database.

5. The system of claim 1, wherein the route search unit determines a route movement order between POIs and sets the course with the selected POI information according to the route movement order, and the route movement order is determined based on an order by which the user selects the POI information, or a short distance order between the POI information selected by the user.

6. The system of claim 1, wherein the menu screen includes at least one form of a search type menu and a selection type menu for user selection of travel information.

7. A method of providing a travel information service, the method comprising:

a first operation of providing a travel course for each area and POI information for each course using a user interface, the user interface provides a selection type menu screen including an area list, a travel course list for each area, and a POI information list for each travel course;

a second operation of creating a travel route based on user selection of the travel course for each area and the POI information for each course, the second operation comprising:

selecting a specific area from the area list provided by the menu screen;

selecting a specific travel course from the travel course list corresponding to the selected area;

selecting at least one piece of POI information from the POI information list corresponding to the selected travel course; and setting a course with the selected POI information and generating a travel route; and a third operation of performing map guidance based on the created travel route.

8. The method of claim 7, further comprising:

a fourth operation of providing a travel course corresponding to a driving area while driving and the POI information of the corresponding travel course, and performing the map guidance based on the travel course of the driving area according to a user request.

9. The method of claim 7, wherein the selection type menu screen of the area list composes the area list by a national map form or a text icon form, and the selection type menu screen of the POI information list composes the POI information list to classify the POI information by a travel theme or an information type.

10. The method of claim 7, wherein the setting sets the course based on a selection order of a user, or sets the course based on a distance order between POIs.

11. The method of claim 10, wherein the second operation further comprises:

providing an editing screen for inputting a trip name when a user instruction 'trip generation' is inputted after the at least one piece of POI information is selected from the selected travel course; and appointing the trip name inputted by a user using the editing screen, as a file name of the generated travel route.

12. The method of claim 10, wherein a menu screen providing the travel course list includes detailed information for each travel course, the detailed information including introduction of each travel course, photograph information, a travel map, and a recommended attraction.

13. The method of claim 12, wherein the photograph information of the travel course displays at least two images on a screen or embodies the at least two images as a slide show type according to a user request.

14. The method of claim 12, wherein the travel map of the travel course displays individual POI information or recommendation POI information included in the corresponding travel course according to a user request, and displays a driving route between POI information.

15. The method of claim 7, wherein the third operation comprises:

displaying a list of the created travel route using the user interface according to a user request; and performing the map guidance of the POI information included in the selected travel route when a travel route selection instruction and a map guidance start instruction are received from a user from among the travel route list.

16. The method of claim 15, wherein the third operation further comprises:

displaying a POI information list included in the selected travel route when a user selects one travel route from the travel route list, wherein a menu screen displaying the travel route list includes a menu in which deletion/editing of the travel route is possible and the POI information list includes a menu in which deletion of individual POI information and editing of the travel route are possible.

17. The method of claim 8, wherein the fourth operation comprises:

searching for a travel course of a currently-driving area while driving when an execution instruction of 'an area travel mode' is received from a user using the user interface;

displaying a menu screen including individual POI information of the travel course corresponding to the driving area; and performing the map guidance based on the individual POI information selected by the user using the menu screen.

18. The method of claim 17, wherein the menu screen displays a directory classified by a travel theme or a travel type with respect to the individual POI information, and when a specific directory is selected, the menu screen orders and displays a POI information list of the corresponding directory.

19. A non transitory computer-readable recording medium storing a program for implementing the method of providing a travel information service, the method comprising:

a first operation of providing a travel course for each area and POI information for each course using a user interface;

a second operation of creating a travel route based on user selection of the travel course for each area and the POI information for each course; and a third operation of performing map guidance based on the created travel route, wherein the user interface provides a selection type menu screen including an area list, a travel course list for each area, and a POI information list for each travel course; and the second operation comprising
- selecting a specific area from the area list provided by the menu screen;
- selecting a specific travel course from the travel course list corresponding to the selected area;
- selecting at least one piece of POI information from the POI information list corresponding to the selected travel course; and
- setting a course with the selected POI information and generating a travel route.

* * * * *